United States Patent
Font et al.

(10) Patent No.: US 6,941,856 B2
(45) Date of Patent: Sep. 13, 2005

(54) HEATING WATER IN HOT DRINK APPLIANCES

(75) Inventors: Vicenc Font, Barcelona (ES); Juan Carlos Coronado, Barcelona (ES); Candelario Martinez, El Prat del Llobregat (ES); Jose Luis Roman, Sant Just Desvern (ES); Antonio Rebordosa, Sant Fruitos de Bages (ES)

(73) Assignee: Braun GmbH, Kronberg (DE)

( * ) Notice: Subject to any disclaimer, the term of this patent is extended or adjusted under 35 U.S.C. 154(b) by 48 days.

(21) Appl. No.: 10/650,005

(22) Filed: Aug. 26, 2003

(65) Prior Publication Data

US 2004/0118292 A1 Jun. 24, 2004

(30) Foreign Application Priority Data

Dec. 19, 2002 (DE) .......................................... 102 60 039

(51) Int. Cl.[7] ................................................. A47J 31/04
(52) U.S. Cl. ............................... 99/307; 99/280; 99/306
(58) Field of Search .......................... 99/280, 304, 305, 99/306, 307, 282, 283

(56) References Cited

U.S. PATENT DOCUMENTS

| | | | |
|---|---|---|---|
| 3,793,934 A | | 2/1974 | Martin |
| 4,448,113 A | | 5/1984 | Brabon |
| 4,920,871 A | | 5/1990 | Anson et al. |
| 4,944,217 A | * | 7/1990 | Watanabe ..................... 99/280 |
| 5,111,740 A | * | 5/1992 | Klein .......................... 99/295 |
| 5,913,961 A | * | 6/1999 | Chmiel et al. ................ 99/286 |

FOREIGN PATENT DOCUMENTS

| | | |
|---|---|---|
| DE | 26 25 791 | 12/1977 |
| DE | 40 38 462 | 6/1992 |
| DE | 601 00 541 | 12/2003 |
| EP | 0 224 041 | 6/1987 |

* cited by examiner

Primary Examiner—Reginald L. Alexander
(74) Attorney, Agent, or Firm—Fish & Richardson P.C.

(57) ABSTRACT

Appliances for the preparation of hot drinks are described herein. The appliances include a water container having a container outlet from which, via a heating device and a riser, water heated by the heating device can be supplied to a mixing device. A specific water level height in the riser can be kept at least largely constant by a constant level holding device.

27 Claims, 5 Drawing Sheets

HEATING WATER IN HOT DRINK APPLIANCES

CROSS-REFERENCE TO RELATED APPLICATIONS

This application claims priority under 35 U.S.C. § 119(a) from German Patent Application No. DE 102 60 039.2, filed on Dec. 19, 2002.

TECHNICAL FIELD

This invention relates to an appliance for the preparation of hot drinks.

BACKGROUND

Hot drinks are often prepared by appliances having a water container with an outlet from which, via a heating device and a riser, water heated by the heating device or steam can be supplied to a brewing or mixing device wherein the water in the riser can be heated by the heating device.

Such appliances operate on the so-called percolator principle whereby water in the riser is heated by the heating device and the vapor bubbles formed during the boiling process rise in the riser and entrain the water with them, which is then supplied to the brewing or mixing device for brewing coffee or for mixing with a powdery coffee, milk or meat stock extract.

The water container is in communication with the riser according to the principle of communicating pipes so that the water level in the riser depends on the respective filling level in the water container. This has the result that in particular when the filling level in the water container is high, there is a volume of water in the riser above the heating device, which is not heated or is only insufficiently heated when the appliance is started up after a shutdown. Thus, this cold water is conveyed to the brewing or mixing device by the vapor bubbles produced in the area of the heating device which results in a largely cold drink and in the case of a brewing device, an at least inadequate brewing of the material to be brewed.

SUMMARY

The object of the invention is thus to provide an appliance of the type specified initially by means of which a supply of fully heated water or steam is accomplished even when starting up the appliance after a shutdown.

This object is solved according to the invention by the fact that one or a plurality of water level heights in the riser can be held at least largely constant by means of a constant-level holding device.

As a result of this design, the volume of the water to be heated in each case is always constant. Thus, the heating device can be designed optimized to this constant volume such that a supply of water or steam according to the thermal pump principle is only initiated under always largely the same conditions when the water contained in the riser is completely heated to a temperature of approximately 90° C. for example. This ensures that a powdery extract of, for example, coffee, milk or meat stock is optimally dissolved and prepared hot and ready to drink. For the brewing of filter coffee, for example, the direct supply of highly heated water ensures an optimum brewing process.

In one aspect, the invention features an appliance for the preparation of hot drinks. The appliance includes a drink preparation chamber where hot water is combined with another substance to prepare a hot beverage and a water supply conduit having an outlet exposed to atmospheric pressure and arranged to dispense hot water into the drink preparation chamber. The water supply conduit includes a riser through which water flows toward the outlet, a heater extending along at least a portion of the riser and heating water in the riser, and a conduit pressure control chamber open to atmospheric pressure. The conduit pressure control chamber is in hydraulic communication with a lower end of the riser such that water in the riser is maintained during heating at a water level between the heater and an upper end of the riser and is substantially equal to a static water level in the pressure control chamber.

In another aspect, the invention features an appliance for the preparation of hot drinks including a drink preparation chamber where hot water is combined with another substance to prepare a hot beverage and a water supply conduit having an outlet exposed to atmospheric pressure and arranged to dispense hot water into the drink preparation chamber. The water supply conduit includes a riser through which water flows toward the outlet, a heater extending along at least a portion of the riser and heating water in the riser, and means for maintaining a substantially constant water level in the riser between the heater and the outlet.

The design with a riser heated by a heating device makes it possible to have a riser of small cross-section and thus low volume uptake so that hot water or steam is supplied after a short time and with a low energy requirement in the fashion of a continuous-flow heater.

In order to achieve optimum utilization of volume and avoid residual, non-optimally heated water, one of the specific water level heights can be near the outlet of the riser.

An especially simply constructed device consists in the fact that the constant level holding device has a container open to the atmosphere and connected to the riser into which the container outlet of the closed water container opens vertically downwards at a level corresponding to a specific water level height.

Thus, the quantity of water is tracked automatically and continuously from the water container into said container and from there to the riser according to the bird drinking principle, which quantity of water was supplied from the riser to the brewing and mixing device.

Another likewise simply constructed design consists in the fact that the constant level holding device has a container connected to the riser into which the container outlet opens, wherein an outlet valve which opens when the water level in the riser falls below the specific water level height is arranged in the container outlet. In this case also, there is accomplished an automatic and continuous tracking of a quantity of water from the water container which corresponds to the quantity delivered by the riser to the brewing or mixing device.

In this case, the outlet valve is preferably controllable by a sensor, which detects the water level in the container.

The outlet valve can be a float valve and the sensor a float sensor so that an especially simple and reliably operating sensor can thus be used.

A design which tracks the water delivered by the riser in a likewise simple fashion is achieved by the constant level holding device having a lifting device by which means the water container can be raised and lowered keeping its water level at the specific water level height in the riser.

In this case, the lifting device can consist of simple means if the lifting device is a spring which supports the water container, in particular a compression spring whose travel is inversely proportional to the water level in the water container.

A continuous tracking of the water delivered hot by the riser to the brewing or mixing device is also the result if the constant level holding device has a sensor which detects the water level height in the riser, by which means a pump arranged in a connection from the water container or a container conveying to the riser can be switched on at a water level below the specific water level height.

In some instances, the constant level holding device has a feed container that is connected to the water container or a container connected to the water container and also to the riser. The water level in the constant level holding device corresponds to the water level of the riser and can be filled up to a level corresponding to the specific water level height. Accordingly, if the water flowing back from the water container is not fast enough, adequate tracking of water to the riser is ensured by immediately tracking and compensating the water delivered by the riser.

When the water tracking from the water container is greater than the quantity of water delivered by the riser, the level in the feed pipe corresponding to the water level height in the riser is ensured if the feed container has an overflow at a level corresponding to the specific water level height in the riser. This allows excess water to be drawn from the riser. In some instances, it is preferable to feed the water back into the water container.

Another method for keeping the water level in the tracking container at the water level height in the riser is to attach a sensor to the feed container at a level corresponding to the specific water level height. A pump is arranged to convey water from the water container to the feed container, and is switched on when the sensor detects a water level below the specific water level height in the riser.

In order to achieve optimum functioning of the water conveyance in the riser according to the thermal pump principle, the riser extends in a substantially vertically ascending direction.

However, it can also extend in an ascending direction inclined at an angle.

An especially fast and complete heating of the water in the riser is achieved if the heating device extends largely over the length of the riser and in particular extends at least as far as close to the outlet of the riser. The heating device can also be constructed such that it begins before the ascent of the riser.

The heating device can be a heating rod, which extends straight or coiled in the riser, wherein the coiled design results in a larger effective length of heating rod for the same longitudinal extension.

The formation of gas bubbles and the flow in the riser are not hindered if the heating device is a heating rod, which extends straight or coiled on the outer wall of the riser.

Especially good heat transfer from the heating device to the water in the riser is achieved if the heating device surrounds the riser.

A simple and rapidly heatable design is thereby achieved if the heating device has one or a plurality of electrical heating resistors.

If the riser is constructed entirely or partly as a heating device, direct and effective heat transfer takes place from the heating device to the water in the riser.

In order to improve the quality of the water a filter can be arranged in the container through which can flow water flowing from the water container to the riser.

If the riser has an enlarged flow-through cross-section in the area of the heating device, larger quantities of water can be heated and conveyed.

In order to prevent overheating of the heating device when there is an insufficient quantity of water in the riser, water filling at least in the area of the heating device can be detected by a sensor and if there is no water filling, a signal that switches off the heating device can be generated.

If the sensor is located approximately in the upper end region of the heating device, the sensor thus responds when the water level begins to no longer completely cover the area of the heating device.

The sensor can be a thermostat of the heating device by which means the temperature of the heating device is also regulated.

For safety the thermostat preferably has an overload safety device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Appliances for the preparation of hot drinks are depicted in FIGS. 1–8. As seen, for example, in FIGS. 1–5, the appliances include a drink preparation chamber 26 and a water supply conduit 30 having an outlet 12 exposed to atmospheric pressure. The water supply conduit 30 includes a riser 7, a heater 10, and a conduit pressure control chamber 31. The conduit pressure control chamber 31 is in hydraulic communication with a lower end of the riser 7 such that the water is maintained at a desirable level.

The appliances for the preparation of hot drinks shown in the figures have a water container 1 with a container outlet 2 on the underside. In FIGS. 1 and 3 to 7 the container outlet 2 leads to a container 3 located below the container outlet 2. In the embodiment depicted in FIG. 1, the container 3 is connected to the riser 7 through a connecting pipe 9. A channel 11 is connected at the top of the riser 7 that has an outlet 12. The outlet is arranged to dispense hot water into a drink preparation device 26.

Figure 2:
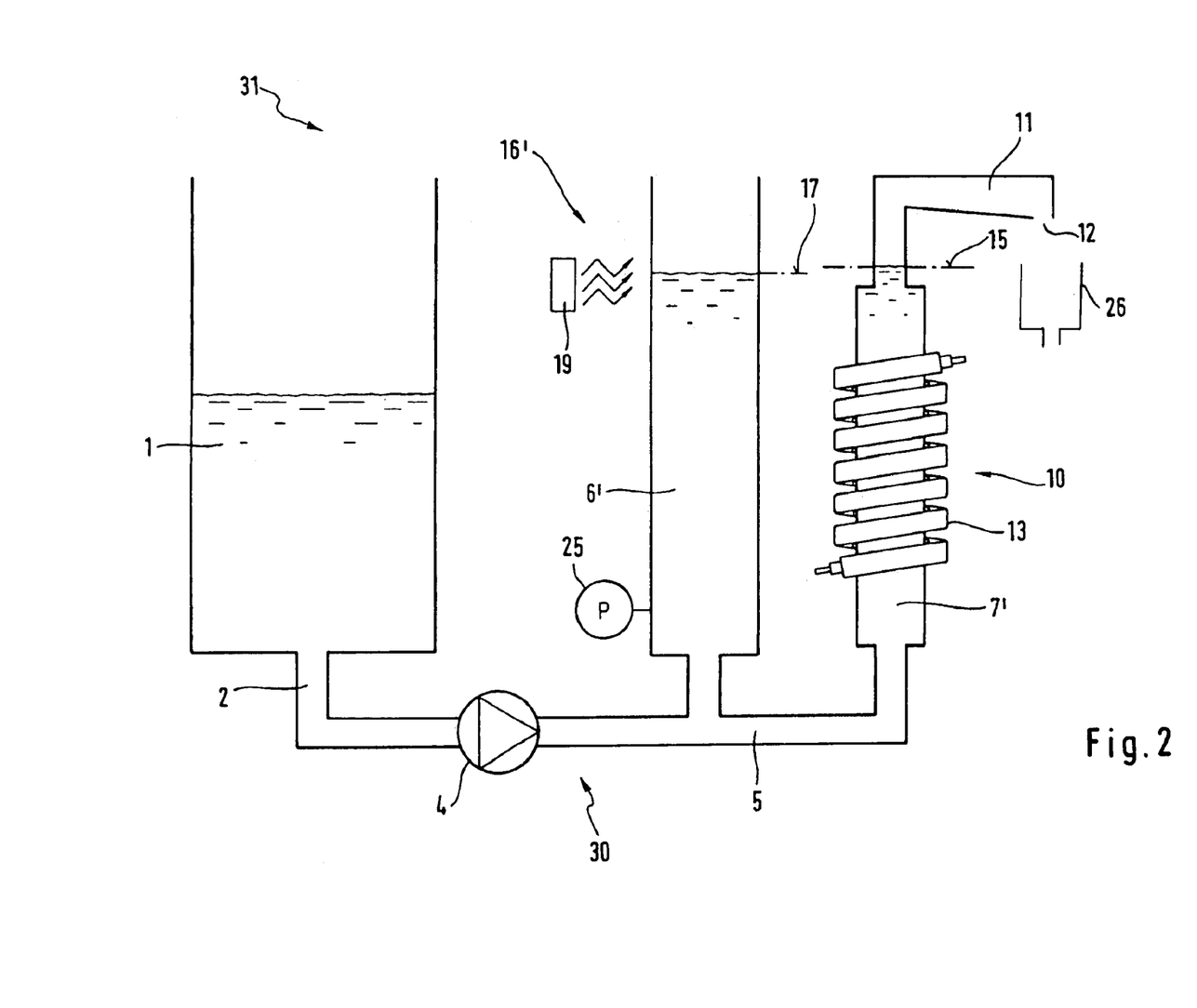
FIG. 2 is a schematic diagram of a second exemplary embodiment of an appliance for the preparation of hot drinks.

In FIG. 2 the container outlet 2 leads to a pump 4 from which water from the water container 1 can be conveyed via a connection 5 both to a feed container 6' and also to the lower end of the riser 7'. As depicted in FIG. 2, the feed container 6' is in fluid communication with the riser 7 through the connection 5, and is also open to atmospheric pressure.

Figure 7:
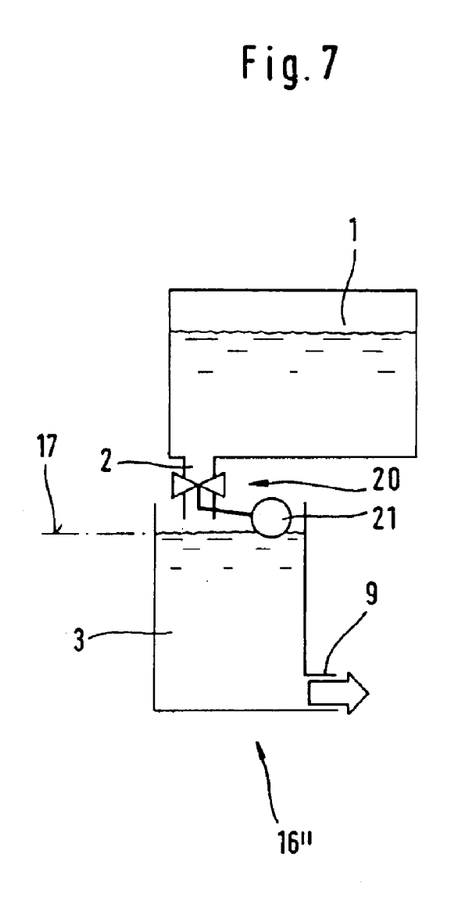
FIG. 7 shows a second exemplary embodiment of a level holding device.
Figure 8:
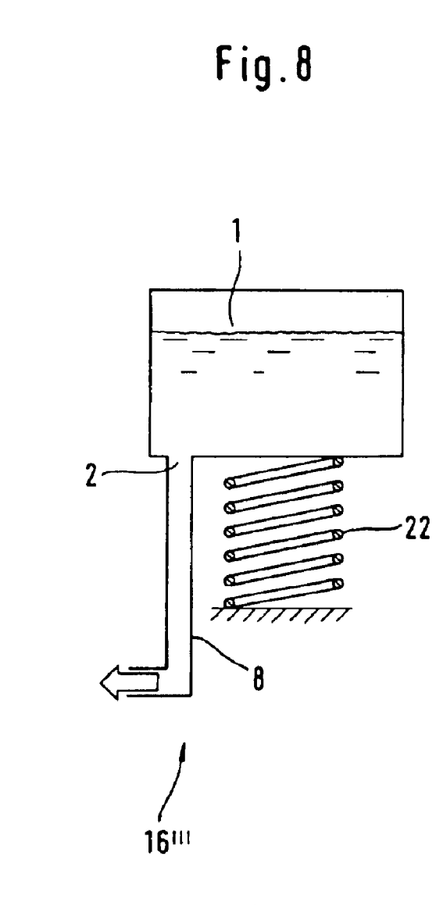
FIG. 8 shows a third exemplary embodiment of a level holding device.

In FIG. 8 a connecting pipe 8 leads directly to the lower end of a riser 7 not shown, whereas in FIGS. 1 and 3 to 7 the bottom region of the container 3 is connected by a connecting pipe 9 to the lower end of a riser 7, 7'.

Figure 3:
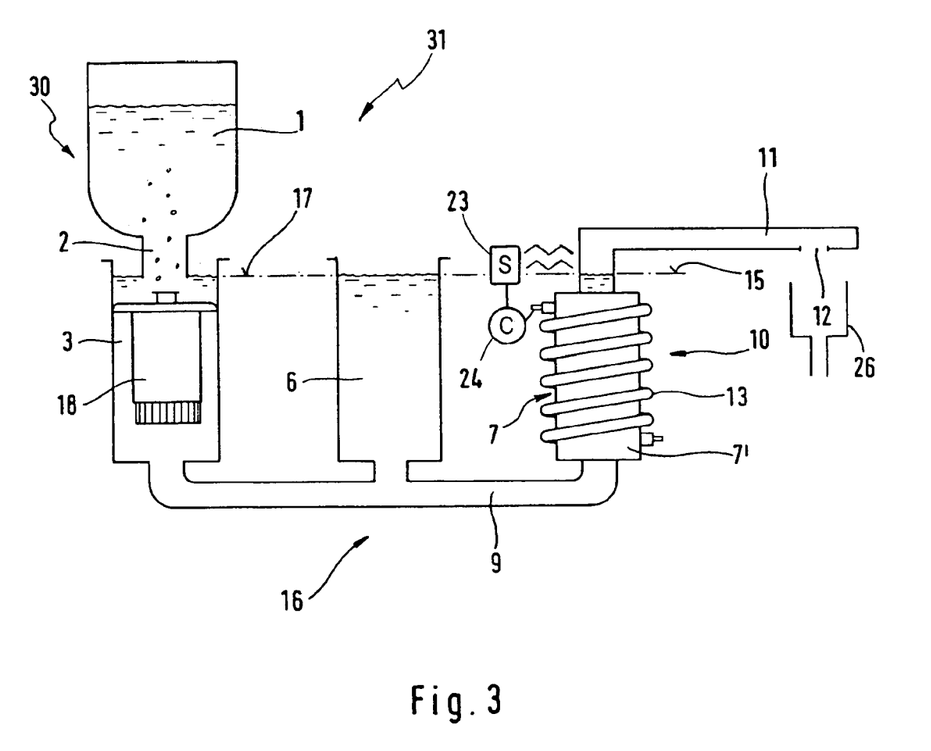
FIG. 3 is a schematic diagram of a third exemplary embodiment of an appliance for the preparation of hot drinks.

In FIG. 3 a feed container 6 is also connected to the connecting pipe 9 at its bottom region.

As can be seen in FIGS. 1 to 5, the riser 7, 7' is provided with a heating device 10.

Figure 1:
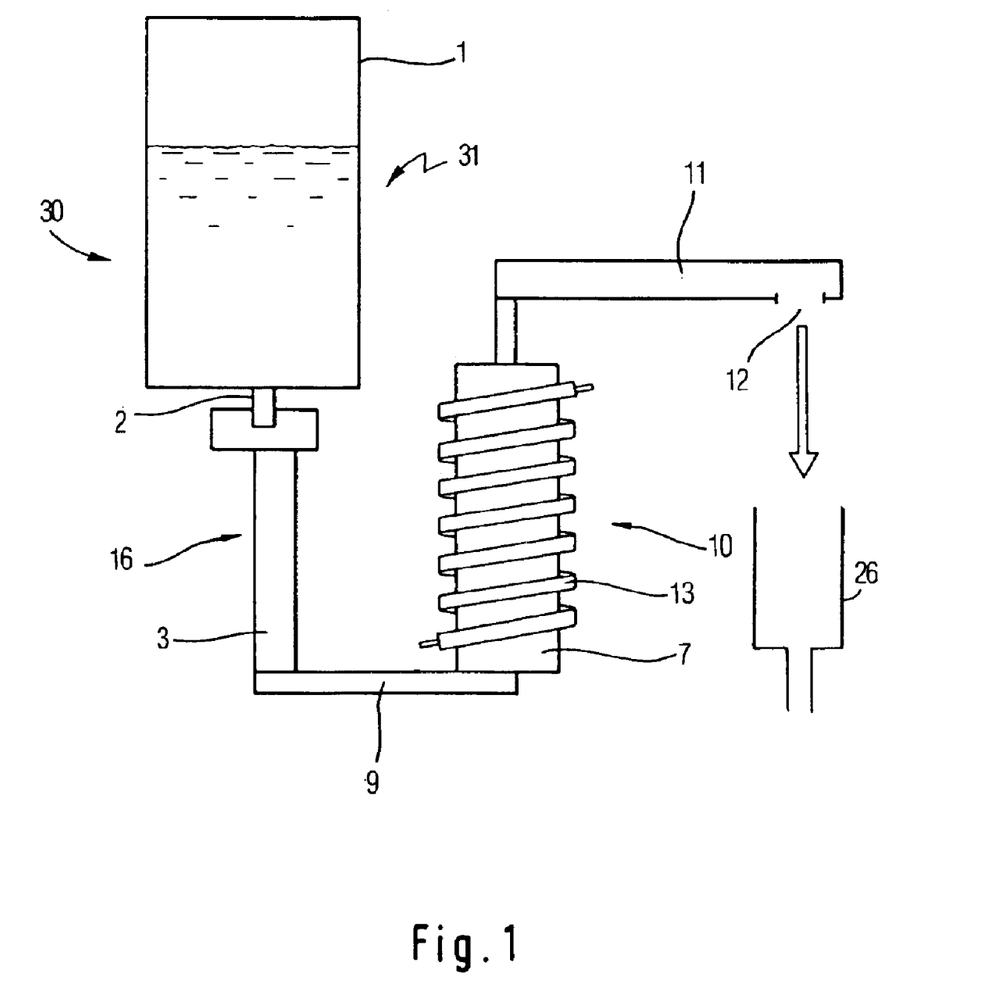
FIG. 1 is a schematic diagram of a first exemplary embodiment of an appliance for the preparation of hot drinks.

The upper end of the riser 7 leads via an approximately horizontal channel 11 to an outlet 12 from which water heated by the heating device or steam is conveyed into the channel 11 according to the principle of a thermal pump and from there it can run into a brewing or mixing device 26. There, for example, ground coffee is brewed or a powdery extract of, for example, coffee, milk or meat stock is mixed.

However, it is also possible to feed only the heated water or the steam into a drink preparation chamber 26, in order to brew tea for example.

Figure 4:
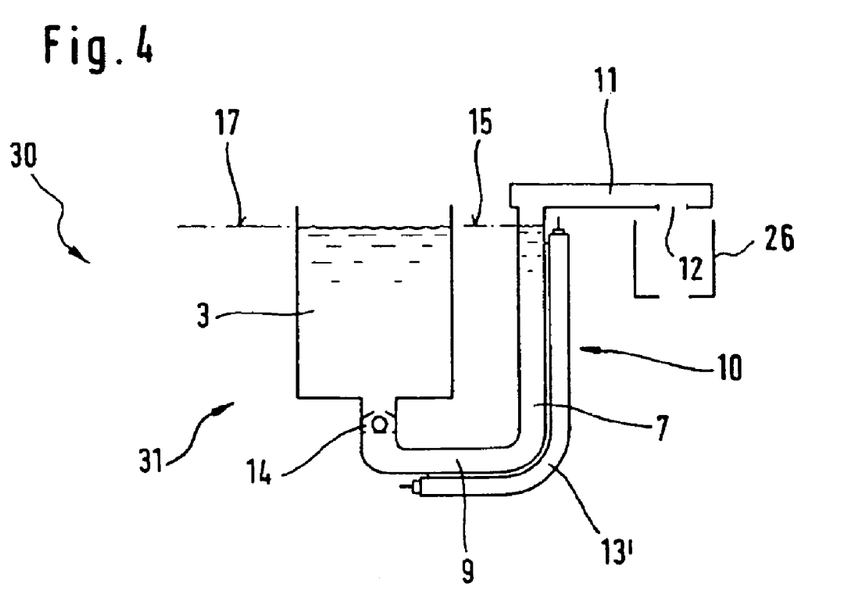
FIG. 4 shows a diagram of a container with a vertical riser.
Figure 5:
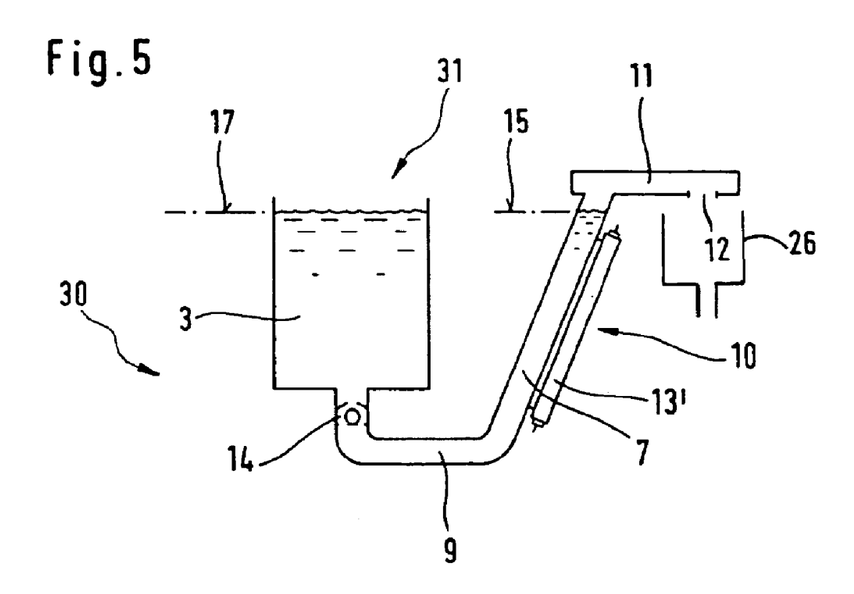
FIG. 5 shows a diagram of a container with an inclined riser.
Figure 6:
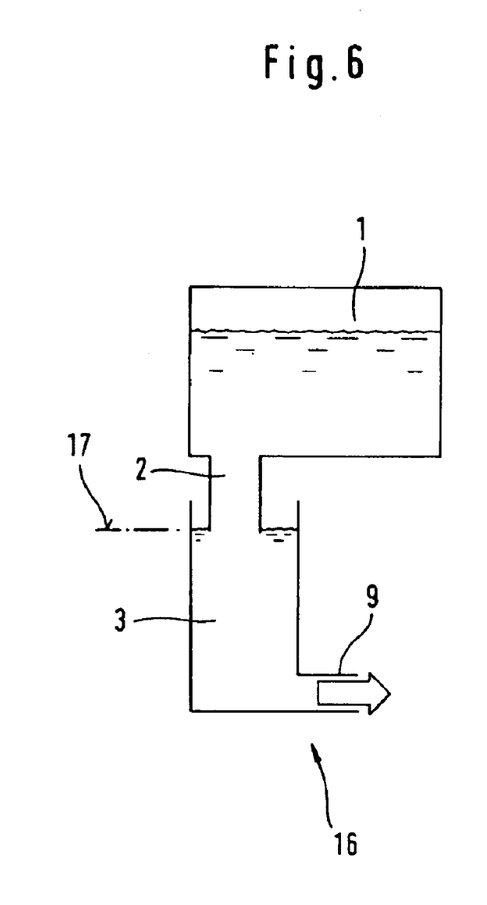
FIG. 6 shows a diagram of a level holding device.

In FIGS. 1 to 3 the heating device 10 consists of a heating resistor 13 which is coiled around the riser 7, 7' whereas in FIGS. 4 and 5 the heating device 10 is a rod-shaped heating resistor 13' which extends along the outer wall of the riser 7 and in the case in FIG. 4 is even guided partly along the connecting pipe 9.

The heating device depicted in FIG. 3 is connected to a sensor 23 that is further connected to a controller 24. The sensor is responsive to the water level in the riser 7'. When the water level falls below a predetermined level, the sensor 23 can send a signal to the controller 24, which can then turn off the heater 13 in order to prevent overheating or a potential short in the circuit.

In FIG. 4 the riser 13 extends vertically and in FIG. 5 it is inclined upwards at an angle.

As shown in FIGS. 4 and 5, a check valve 14 that prevents any backflow from the connecting pipe 9 into the container 3, can be arranged in the mouth area of the connecting pipe 9 in the container 3.

In order to increase the volume of water that can be heated, in the exemplary embodiments in FIGS. 1 to 3 the riser 7' is constructed with an enlarged flow-through cross-section compared with the connecting pipe 5, 8 or 9.

A level holding device 16, 16', 16" is provided in order to keep constant a specific water level height 15 in the riser 7, 7' near the outlet at the upper end of the riser 7, 7'.

In the exemplary embodiments in FIGS. 1 and 3 to 6 the level holding device 16 is formed by the container outlet 2 of the water container 1 opening vertically downwards into the container 3 at a level 15 corresponding to the specific water level height 15, said container being connected via the connecting pipe 9 to the riser 7, 7' in the fashion of a communicating pipe. In this case, the water level height 15 and the level 17 are always the same. The water container 1 is constructed as closed apart from its container outlet 2. By this means, when the mouth of the water outlet 2 is immersed in the water of the container 3, any backflow of water from the water container 1 to the container 3 is prevented by the atmospheric pressure acting on the surface of the water in the container 3.

As soon as the water level in the riser 7, 7' drops as a result of conveyance through the channel 11 to the brewing and mixing device, the water level in the container 3 drops accordingly and exposes the mouth of the container outlet 2. As a result, water runs from the water container 1 into the container 3 and air flows from outside via the water outlet 2 into the water container 1 until the mouth of the water outlet is again closed by the water in the container 3 and a compensated state is re-established. The water level height of the riser 7, 7' is thereby automatically kept constant.

In the exemplary embodiment in FIG. 3, a filter 18 is also located in the container 3, through which flows water flowing from the water container 1 to the riser 7'. In order to compensate for non-uniformities as a result of the flow resistances of the filter 18 during flow back of the water, the volume of water present in the feed container 6 forms a buffer. The water level in the feed container 6 always corresponds to the water level in the riser 7'. Since the cross-section of the feed container 6 is substantially larger than the cross-section of the riser 7', fluctuations in the flow back from the container 3 have only slight effect on keeping the water level in the riser 7' constant at the specific water level height 15.

In the exemplary embodiment in FIG. 2 the level holding device 16' is formed from the feed container 6' which can be filled by the pump 4 to a level 17 corresponding to the specific water level height 15 in the riser 7'. For this purpose the pump 4 is controlled by a sensor 19 that switches off the pump 4 when the level 17 is exceeded and switches on the pump 4 below the level 17. The water level in the feed container 6' is thereby always kept at the level 17 and thus the water level is always kept at the specific water level height 15.

Also depicted in FIG. 2 is a pressure gauge 25 positioned in the bottom portion of the feed container 6'. The pressure gauge can be used as an alternative to the sensor 19 to control the pump 4. The pressure gauge 25 measures the static pressure of water, where an increase in amount of water in the feed container 6' will result in an increase in pressure on the pressure gauge 25. For this purpose, the pump 4 is switched off when the level of the pressure in the pressure gauge 25 exceeds a predetermined amount, and the pump 4 is switched on when the pressure in the pressure gauge 25 falls below a predetermined amount.

In FIG. 7 the level holding device 16" has a float valve 20 in the container outlet 2, whose float 21 detects the water level in the container 3 and thus the water lever in the riser. If the water level in the container 3 drops below a level corresponding to the specific water level height in the riser, the float valve 20 opens so that water can flow from the water container 1 through the container outlet 2 into the container 3. If a level corresponding to the specific water level height in the riser is then reached in the container 3, the float valve 20 closes again.

In FIG. 8 the level holding device 16''' is formed by the entire water container 1 being arranged such that it can be raised and lowered. For this purpose the water container 1 is supported on a compression spring 22 whose travel is inversely proportional to the water level in the water container 1. The filling level in the water container 1 is located at the specific water level height of a riser not shown. If water flows from the water container 1 to the riser, since this hot water is delivered to a brewing or mixing device, the water container 1 becomes lighter by the volume of water that has flown out. This lightening has the result that the compression spring 22 raises the water container 1 by the amount that the water level in the water container 1 has dropped so that the level in the water container 1 and in the riser remains at a specific water level height.

A number of embodiments of the invention have been described. Nevertheless, it will be understood that various modifications may be made without departing from the spirit and scope of the invention. Accordingly, other embodiments are within the scope of the following claims.

What is claimed is:

1. An appliance for the preparation of hot drinks, the appliance comprising;
   a drink preparation chamber in which hot water is combined with another substance to prepare a hot beverage; and
   a water supply conduit having an outlet exposed to atmospheric pressure and arranged to dispense hot water in the drink preparation chamber, the water supply conduit including;
   a riser through which water flows toward the outlet;
   a heater extending along at least a portion of the riser and heating water in the riser; and
   a conduit pressure control chamber open to atmospheric pressure and in hydraulic communication with lower end of the riser such that water in the riser that is maintained during heating at a water level between the heater and an upper end of the riser and substantially equal to static water level in the pressure control chamber, wherein the pressure control chamber further comprises an overflow chamber at a level corresponding to the level of water in the riser that is between the heater and the outlet.

2. The appliance of claim 1 wherein the pressure control chamber further comprises a pressure sensor gauge responsive to static water pressure in the water supply conduit.

3. The appliance of claim 1 further comprising an optical sensor responsive to water level in the pressure control chamber.

4. The appliance of claim 1 further comprising a check valve preventing backflow from the riser into the pressure control chamber.

5. The appliance of claim 1 wherein the water supply conduit further comprises a water supply chamber in fluid communication with the pressure control chamber and containing a quantity of water for replenishing the water supply conduit to replace dispensed hot water.

6. The appliance of claim 5 further comprising a pump hydraulically disposed between the water supply chamber and the pressure control chamber.

7. The appliance of claim 5 wherein the water supply chamber has a water outlet extending downward into the pressure control chamber.

8. The appliance of claim 7 wherein the water outlet includes a valve that is controlled by a sensor responsive to water level in the pressure control chamber.

9. The appliance of claim 8 wherein the sensor is an optical sensor.

10. The appliance of claim 8 wherein the sensor is a pressure gauge.

11. The appliance of claim 8 wherein the water outlet includes a float valve outlet and the sensor is a float sensor.

12. The appliance of claim 5 further comprising a filter positioned between the water supply chamber and the pressure control chamber.

13. The appliance of claim 1 further comprising a spring positioned below the pressure control chamber, wherein the spring expands to provide a substantially constant static water level in the pressure control chamber as the amount of water in the pressure control chamber diminishes.

14. The appliance of claim 1 wherein the riser extends in a substantially vertical direction.

15. The appliance of claim 1 wherein the riser extends at an angle inclined to vertical.

16. The appliance of claim 1 wherein the heater extends substantially over the length of the riser.

17. The appliance of claim 16 wherein the heater is a heating rod.

18. The appliance of claim 17 wherein the heating rod is coiled about the riser.

19. The appliance of claim 17 wherein the heating rod extends along an outer wall of the riser.

20. The appliance of claim 1 wherein the heater surrounds the riser.

21. The appliance of claim 1 wherein the riser has its greatest cross-sectional area in the portion along which the heater extends.

22. The appliance of claim 1 further comprising a sensor responsive to water level in the riser.

23. The appliance of claim 22 wherein the sensor responsive to water level further comprises a controller that disables the heater when the water level in the riser falls below a predetermined level.

24. An appliance for the preparation of hot drinks, the appliance comprising;
   a drink preparation chamber in which hot water is combined with another substance to prepare a hot beverage; and
   a water supply conduit having an outlet exposed to atmospheric pressure and arranged to dispense hot water into the drink preparation chamber, the water supply conduit including;
   a riser through which water flows toward the outlet;
   a heater extending along at least a portion of the riser and heating water in the riser; and
   a conduit pressure control chamber open to atmospheric pressure and in hydraulic communication with lower end of the riser such that water in the riser that is maintained during heating at a water level between the heater and an upper end of the riser and substantially equal to static water level in the pressure control chamber, wherein the pressure control chamber further comprises a pressure sensor gauge responsive to static water pressure in the water supply conduit.

25. An appliance or the preparation of hot drinks, the appliance comprising;
   a drink preparation chamber in which hot water is combined with another substance to prepare a hot beverage; and
   a water supply conduit having an outlet exposed to atmospheric pressure and arranged to dispense hot water into the drink preparation chamber, the water supply conduit including;
   a riser through which water flows toward the outlet;
   a heater extending along at least a portion of the riser and heating water in the riser;
   a conduit pressure control chamber open to atmospheric pressure and in hydraulic communication with a lower end of the riser such that water in the riser that is maintained during heating at a water level between the heater and an upper end of the riser and substantially equal to a static water level in the pressure control chamber; and
   an optical sensor responsive to water level in the pressure control chamber.

26. An appliance for the preparation of hot drinks, the appliance comprising;

a drink preparation chamber in which hot water is combined with another substance to prepare a hot beverage; and a water supply conduit having an outlet exposed to atmospheric pressure and arranged to dispense hot water into the drink preparation chamber, the water supply conduit including;

a riser through which water flows toward the outlet;

a heater extending along at least a portion of the riser and heating water in the riser; and a conduit pressure control chamber open to atmospheric pressure and in hydraulic communication with lower end of the riser such that water in the riser that is maintained during heating at a water level between the heater and an upper end of the riser and substantially equal to static water level in the pressure control chamber; wherein the water supply conduit further comprises a water supply chamber in fluid communication with the pressure control chamber and containing a quantity of water for replenishing the water supply conduit to replace dispensed hot water, the water supply chamber having a water outlet extending downward into the pressure control chamber, and the water outlet including a valve that is controlled by a sensor responsive to water level in the pressure control chamber.

27. An appliance for the preparation of hot drinks, the appliance comprising;

a drink preparation chamber in which hot water is combined with another substance to prepare a hot beverage; and a water supply conduit having an outlet exposed to atmospheric pressure and arranged to dispense hot water into the drink preparation chamber, the water supply conduit including;

a riser through which water flows toward the outlet;

a heater extending along at least a portion of the riser and heating water in the riser; and a conduit pressure control chamber open to atmospheric pressure and in hydraulic communication with lower end of the riser such that water in the riser that is maintained during heating at a water level between the heater and an upper end of the riser and substantially equal to static water level in the pressure control chamber; and a sensor responsive to water level in the riser, wherein the sensor comprises a controller that disables the heater when the water level in the riser falls below a predetermined level.

* * * * *